(12) United States Patent
Krantz (10) Patent No.: US 10,005,146 B2
(45) Date of Patent: Jun. 26, 2018

(54) CHAIN SAW CHAIN SHARPENING DEVICE

(71) Applicant: Krash, Inc., Idaho Falls, ID (US)

(72) Inventor: Philip Krantz, Idaho Falls, ID (US)

(73) Assignee: Krash, Inc., Idaho Falls, ID (US)

(*) Notice: Subject to any disclaimer, the term of this patent is extended or adjusted under 35 U.S.C. 154(b) by 0 days. days.

(21) Appl. No.: 15/040,956

(22) Filed: Feb. 10, 2016

(65) Prior Publication Data

US 2017/0225248 A1   Aug. 10, 2017

(51) Int. Cl.
*B23D 63/16* (2006.01)

(52) U.S. Cl.
CPC ......... *B23D 63/166* (2013.01); *B23D 63/162* (2013.01)

(58) Field of Classification Search
CPC .............................. B23D 63/16; B23D 63/162
USPC ........ 451/45, 28, 419, 420, 438–439; 76/82, 76/80.5, 88
See application file for complete search history.

(56) References Cited

U.S. PATENT DOCUMENTS

| | | | |
|---|---|---|---|
| 2,677,289 A | 5/1954 | Fitch | |
| 2,770,985 A * | 11/1956 | Pearce | B23D 63/162 76/31 |
| 3,042,003 A | 7/1962 | Cayo | |
| 3,744,349 A * | 7/1973 | Juncker | B23D 63/162 76/31 |
| 4,404,871 A * | 9/1983 | Fritz | B23D 63/162 33/202 |
| RE31,504 E | 1/1984 | Aksamit | |
| 4,463,499 A * | 8/1984 | Fritz | B23D 63/16 16/110.1 |
| 4,677,881 A * | 7/1987 | Jorde | B23D 63/162 76/37 |
| 4,684,897 A | 8/1987 | Richards et al. | |
| 5,983,755 A | 11/1999 | Juncker et al. | |
| 6,058,806 A | 5/2000 | Ford | |
| 8,550,884 B2 * | 10/2013 | Jorde | B23D 63/162 451/349 |
| 2009/0199680 A1* | 8/2009 | Jorde | B23D 63/162 76/80.5 |

* cited by examiner

*Primary Examiner* — Robert Rose (57) ABSTRACT

A device for sharpening the cutting teeth of a chain saw includes a frame having an upper web and first and second side walls, and an open area defining a sharpening area. The device further includes at least one clamping member operable with at least one of the first and second sidewalls of the frame for securing the frame to the guide bar of the chain saw. The device still further includes a second clamping member movably supported about the frame, which operates to engage a chain saw tooth of a chain and to fix its position within the sharpening area. The second clamping member includes a tooth stop for adjusting the position of the chain saw tooth within the sharpening area. The tooth stop includes a pawl support block and a pawl having at least one working portion engageable with the chain at different positions along a lateral axis of the pawl support block to provide clearance for a sharpening tool within the sharpening area.

20 Claims, 10 Drawing Sheets

CHAIN SAW CHAIN SHARPENING DEVICE

BACKGROUND

The present disclosure relates to an improved device for sharpening the teeth of a chain saw and, more particularly, to a chain saw sharpener that permits the consecutive sharpening of left-hand and right-hand teeth and provides for the accurate, uniform sharpening of the chain saw teeth despite repeated use.

An assortment of portable devices are available for the on-site sharpening of the teeth of a chain saw. However, common problems accompany the use of these sharpening devices, principal among them being the inability to uniformly sharpen both the left-hand and right-hand teeth, and the repeated adjustment of the sharpening device in an attempt to so sharpen the chain saw teeth. Uniformity in the size and shape of the cutting teeth is essential for obtaining a straight, even cut through a work piece. Additionally, many of these devices require a relatively involved setup procedure in which a plurality of jig members must be manipulated before the sharpening process can begin. Because of the numerous adjustments required to set up their devices, the settings of the sharpening devices invariably change during use, resulting in either a constant readjustment of the devices or a non-uniform sharpening of the chain saw teeth. Still further problems exist in these prior devices, such as the inability to sharpen and re-sharpen the chain saw teeth to achieve the full life of the chain saw teeth. Indeed, in some cases, the chain saw teeth can only be sharpened to a certain degree (i.e., only a limited amount of material can be removed) limited by the configuration and capability of the sharpening device itself. In some cases, when the material of the chain saw teeth is reduced beyond a certain point, but not beyond what one would consider as still having usable material that would extend the life of the chain saw chain, the sharpening devices used can begin to cut into the structure securing the chain saw teeth in place, thus making any further sharpening of the chain saw teeth impossible without destroying the sharpening device or its component parts.

Many prior sharpening devices can first sharpen all the teeth of a like hand (i.e., either all the left-hand teeth or all the right-hand teeth) and then the sharpener can be readjusted to sharpen the teeth of the opposite hand. However, when using cumbersome jig-type setups, this requires that the jig members be repeatedly manipulated for sharpening the teeth of opposite hands. Further, the readjustment after first sharpening all the teeth of one hand often results in an undesirable variance between the teeth of the opposite hands. An additional series of relatively complicated adjustments also must be made to cut the depth gauge portions of the teeth.

To add to the difficulty and limitations of prior sharpening devices, the rake angle of the teeth on different makes of saw chains often varies, the rake angle typically being 25°, 30°, or 35° with respect to a reference line perpendicular to the cutting bar of the chain saw. However, many prior sharpening devices are able to sharpen the teeth of only one rake angle, thus limiting their utility.

Other sharpening devices exists that allow for the sharpening the teeth of opposite hands and of different rake angles. However, these often require extensive machining to manufacture, thus making such sharpening devices very expensive. Further to allow for the sharpening of chain saw teeth of different rake angles, an entire section of the sharpener must be removed and replaced, thus adding to the cost and complexity of the sharpening device.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A device for sharpening the cutting teeth of a chain saw while the chain is in place on the guide bar of the chain saw is presented. The device has a frame that can be formed by extruding to reduce cost of the device. The frame has an upper web and first and second parallel side walls for overlying the chain and guide bar of the chain saw. An open area is formed in the frame adjacent the center of the upper web defining a sharpening area. A clamp means associated with the first side wall can secure the frame to the guide bar. A different clamp means can be used to lightly engage the chain saw tooth to be sharpened in order to fix its position with respect to the sharpening area.

A tooth stop pawl is provided for adjusting the position of the tooth within the sharpening area. The tooth stop pawl is mounted in a sliding pawl support block received in a keyway in the upper web of the frame. If the frame is formed in an extrusion process, the keyway can extend from a first end of the upper web to a second end. The keyway is aligned with the guide bar of the chain saw and permitting only a single degree of freedom in the direction of the guide bar. A pawl is pivotally attached to the sliding block and extends into the open sharpening area. An adjustment bolt can be associated with the sliding block of the tooth stop pawl and rotatably captured with respect to the frame for adjusting the position of the sliding block along the length of the keyway. In certain embodiments, the adjustment bolt is a washer faced bolt that is rotatably captured by an indent within the keyway with a sliding block being threaded along a channel on its bottom and a corresponding channel in the keyway being free of threads.

A burr guide can be disposed within the second wall of the frame. Each burr guide is independently removable and attachable to the housing. In certain embodiments, channels can be formed in the side wall for receiving therein the burr guides. The channels can be bores formed in the side wall. Such bores can have a center axis that crosses the center of the sharpening area at an angle between about 20° and 40° including at an angle of about 30°.

In certain embodiments, the bores of the guides are disposed at an angle from a center axis for the guide. The angle can be in the range from about 1 to about 100. In other embodiments, the angle is about 5°. This configuration will allow the same burr guide to be used to precisely sharpen teeth having differing guide angles. For example if the bore is cut in the side wall at an angle to the tooth of about 30°, then a burr guide having an bore that deviates about 5° from its center axis will be configured to sharpen a tooth having a cutting surface of about 25° in when the guide is in a first position and configured to sharpen a tooth having a cutting angle of about 35° when the guide means is rotated about its center axis 180°. In yet other embodiments, the bore of the burr guide can be coaxial to the center axis of the burr guide.

The first and second bores in the side wall of the frame can taper from a larger diameter adjacent the outside of the second wall to a smaller diameter adjacent the sharpening area. In this configuration, the bore guides can have a substantially conical form.

In some examples, the present disclosure sets forth a sharpening device for sharpening the cutting teeth of a chain saw chain, the sharpening device comprising a frame having an upper web and first and second side walls; an open area adjacent a center of the upper web defining a sharpening area; at least one clamping member operable with at least one of the first and second sidewalls of the frame for securing the frame to a guide bar of the chain saw; and a second clamping member movably supported about the frame. The second clamping member can operate to engage a chain saw tooth of a chain, and to fix a position of the chain saw tooth with respect to the sharpening area. The second clamping member can comprise a tooth stop comprising a pawl support block and a pawl having at least one working portion engageable with the chain at different positions along a lateral axis of the pawl support block. This can advantageously provide clearance for a sharpening tool within the sharpening area, such that no pawl structure within the sharpening area interferes with the sharpening tool during a sharpening operation. The sharpening device can further comprise an adjustment member for adjusting the position of the tooth stop relative to the frame.

Referring to FIGS. 1-4 an exemplary embodiment of a chain saw sharpener generally indicated by 10. The sharpener can be placed on the cutter or guide bar of a chain saw (not shown) in order to sharpen the teeth of a saw chain. The saw chain is of a well known design and includes left-hand and right-hand cutting teeth, arranged alternately on opposite sides of the chain and connected by tie straps or side links to driver links to form a one-piece endless chain. The driver links have a projecting portion that is received in a guide channel that extends about the periphery of the guide bar.

Figure 1:
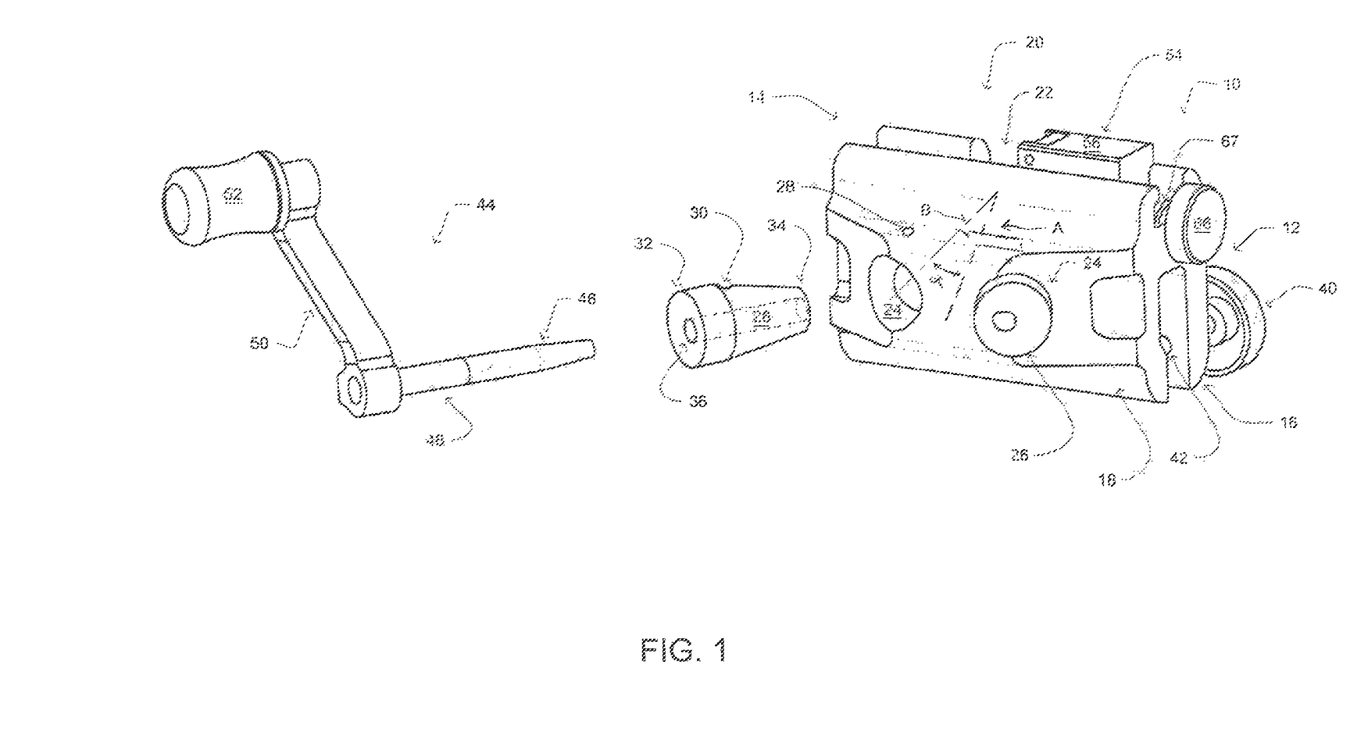
FIG. 1 is a perspective view of a chain saw sharpener in accordance with one example of the present disclosure.
Figure 2:
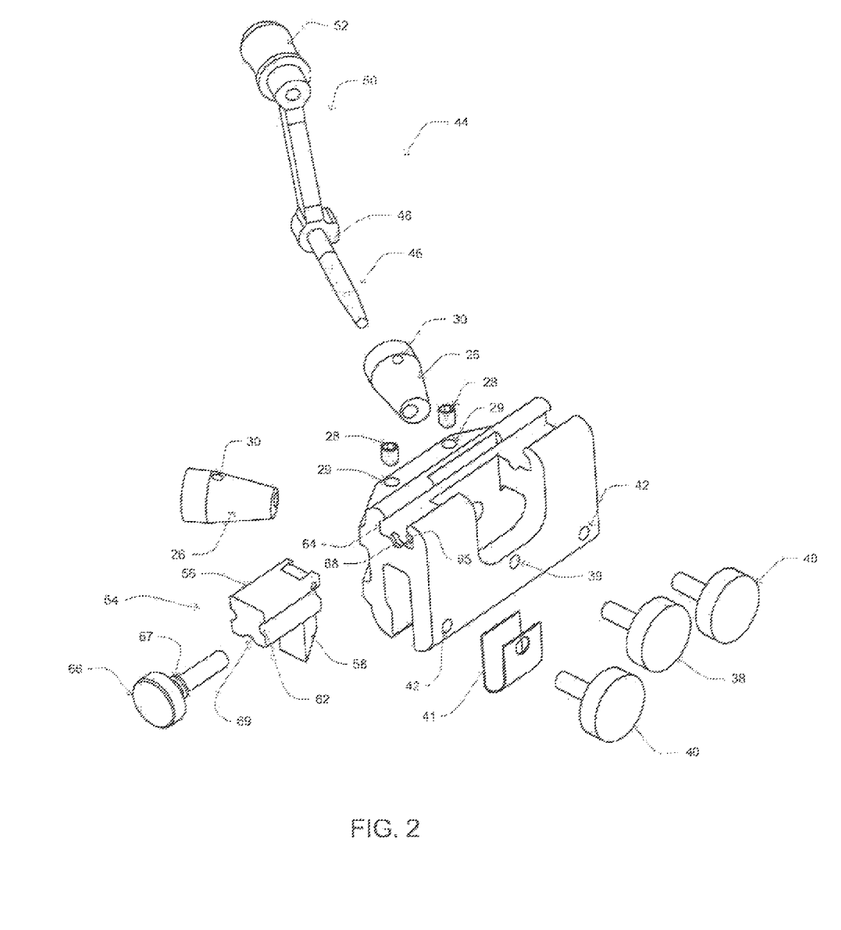
FIG. 2 is an exploded view of the chain saw sharpener of FIG. 1.
Figure 3:
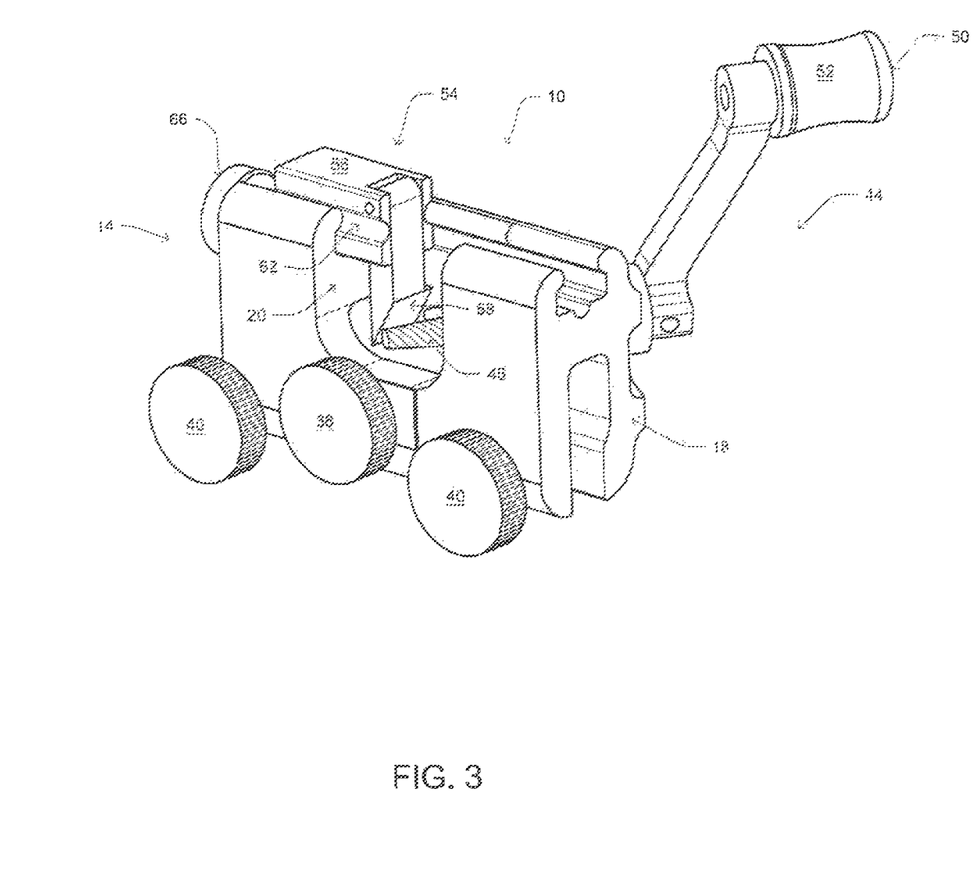
FIG. 3 is a reversed perspective view of the chain saw sharpener of FIG. 1.

The sharpener 10 includes a generally U-shaped frame 12 having an upper web 14 connecting first and second side walls 16, 18 respectively. A central portion 20 of the upper web 14 and the first side wall 16 is cut away to define an open area 22 through the web 14 and side wall 16 for receiving the chain saw tooth to be sharpened. The second side wall 18 also has channels 24 diagonally formed from exterior to the open area 22. In the illustrated embodiment, the channels 24 take the form of bores 24. However, in other embodiments, the channels 24 can take other forms. The channels/bores 24 are configured to each independently receive a removable burr guide 26. The independently removable burr guides 26 can be secured within the bores 24 by tightening set screws 28 within holes 29. The burr guides have an indent 30 for receiving a portion of the screws 28.

Figure 4:
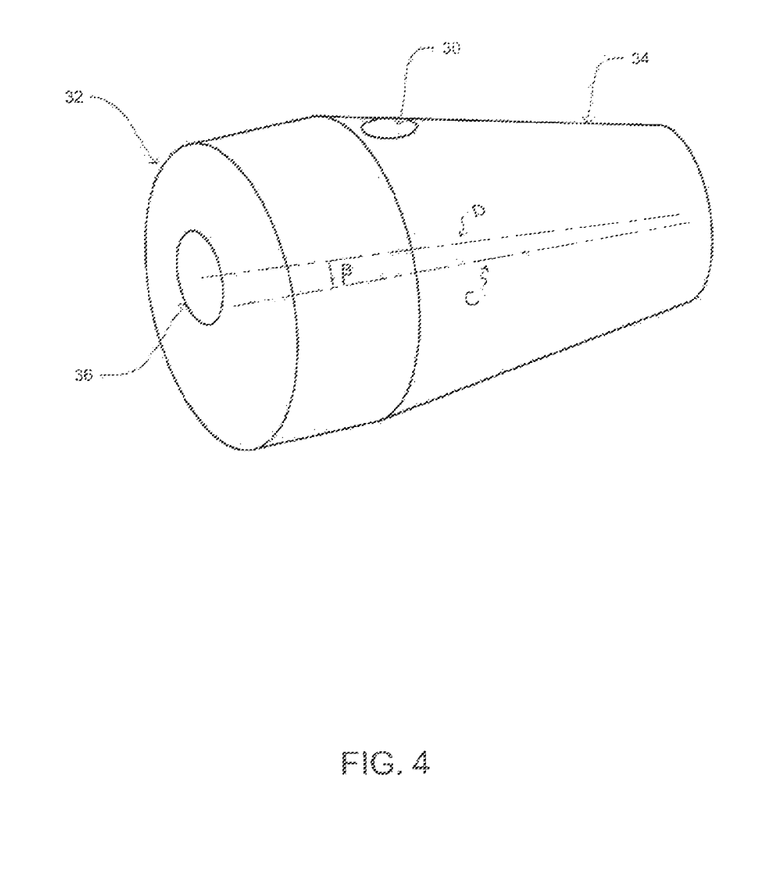
FIG. 4 is a perspective view of a burr guide in accordance with one example.

In the illustrated embodiment, the burr guides 26 are tapered from first diameter at a first end 32 to a narrower diameter at a second end 34. Corresponding tapers are found in the bores 24 within the second side wall 18. The burr guides 26 have a conduit 36 extending from the first end 32 to the second end 34. The conduit 36 can be a bore 36 as illustrated.

The center axis B of bores 24 is symmetrically inclined about a line A perpendicular to the guide bar of the chain and the sharpening area at an angle α. Angle α can vary but can be in the range from about 20° to about 40°. In one presently preferred embodiment angle α is about 30°.

The bore 36 of the burr guides 26 can be formed at an angle α to the center axis C of the burr guides 26. For example as seen in FIG. 4, the center axis D of the bore 36 forms an angle α with the center axis C of the burr guide. The angle β can vary and can be coaxial with the center axis C (0°) or can be in the range from about 1 to about 10°.

The angle β of the bore 36 is selected, when combined with the angle α of the bore 24, to substantially equal the rake angle of the tooth to be sharpened. For example if the rake angle of the tooth is 30° and the angle α is about 30° then the angle β of the burr guide bore 36 can be about 0° (coaxial with the center axis C of the burr guide 26). Likewise if the rake angle is about 35° and the center and the angle α is about 30° then the angle β of the burr guide bore 36 can be about 5°. This combination of 30° and 5° will equal the rake angle 35° of the tooth. In certain embodiments, and burr guide 26 having a bore 36 at an angle β of about 5° from the center axis C can be rotated 180° to create an angle of about −5°. This reversed bore guide 26 will then have a combined angle of about 25° and can be used to sharpen a tooth having a rake angle of about 25°.

To securely position a tooth of the saw chain within the open sharpening area 22 of the frame 12, a clamping screw 38 is received within an internally-threaded bore 39 in the side wall 16 disposed adjacent the opening 22. The clamping screw 38 acts on a U-shaped spring clamp 41. The spring clamp 41 serves to maintain the perpendicular alignment of left-hand teeth during sharpening. Perpendicular alignment of right-hand teeth is maintained by their contact during sharpening with the side wall 18. When a tooth link is positioned within the opening 22 the clamping screw 38 is adjusted to hold the link in place.

To securely hold the sharpener 10 onto the guide bar of the chain saw, the frame 12 is supplied with additional clamping screws 40 received in threaded bores 42 in the lower, outer portions of the side wall 16. The ends of the screws 40 can be cupped (as opposed to being flat or rounded) in order to provide increased holding power between the screws 40 and the guide bar. When the sharpener 10 is positioned over the guide bar, the clamping screws are tightened to hold the guide bar against the shoulder on the lower interior portion of the side wall 16 to prevent relative motion between the sharpener 10 and the guide bar.

With a tooth link properly aligned within the sharpening area 22 and the sharpener 10 clamped onto the guide bar, the tooth is sharpened by means of a rotary cutter or burr, generally indicated by 44, that is inserted into either of the bores 36 of the burr guides 26. The rotary burr 44 is preferably made of a high-impact carbide material that is highly chip-resistant and has a conically-shaped, spiral, abradant cutting surface 46. The shaft portion 48 is sized in diameter to be slightly less than the inside diameter of the bores 36 so as to provide the accurate rotation of the rotary burr 44 about the axis of either of the bores 36. A crank member 50 is secured to the shaft portion 48 a freely-rotatable handle 52 is secured to the crank member 50.

In keeping with the examples of the present invention, means are provided for accurately positioning the tooth links within the opening 22 of the sharpener 10 so as to repeatedly and precisely position subsequently-sharpened teeth within the opening, resulting in that all the teeth will be sharpened to the same extent and length. Such uniformity in size of the sharpened teeth ensures a straight, even cut through a workpiece, eliminating chain tooth radius cutting. To this end, a tooth stop, generally indicated by 54, is movably secured to the frame 12 of the sharpener 10 so as to engage the rearmost portion of a tooth link, whether a left-hand or right-hand tooth, to position each such tooth link at the same position within the opening 22 in the frame 12 with respect to the rotary burr 44.

The tooth stop 54 comprises a pawl-support block 56 having a forked end to which a pawl member 58 is so that the pawl 58 is able to pivot out away from the support block 56 but abuts the support block 56 so that the pawl 58 cannot pivot in toward the support block 56 past an angle substantially perpendicular to the support block 56.

Integral with the support block 56 is a slide member 62 that interfits with an undercut slot 64 in the upper surface of the web portion 26 of the sharpener frame 24. As illustrated, the slide member 62 is in the form of a dovetail tenon and the slot 64 is in the complementary form of a dovetail mortise, the undercut slot 64 extending from one end of the frame 12 to the other. The slide member 62 and undercut slot 64 are manufactured to close tolerances so that any movement of the support block 56 other than along the slot 64 is substantially eliminated, i.e., the support block 56 has only a single degree of freedom along the length of the slot 64 and will not move up and down or angularly with respect to a vertical axis through the slot.

In order to precisely position the support block 56 along the length of the undercut slot 64 (and, consequently, precisely locate the pawl member 58 within the opening 22) a threaded adjustment bolt 66 has a washer face 67 that is captured within in a detent 68 formed in the slot 64. The slot has a half channel 65 that is not threaded and the block 56 has a half channel 69 that is threaded. The threaded portion of the bolt 66 is received in threaded half channel 69 in the block 56 so that, upon rotation of the bolt 66, the threaded portion will be advanced into or retracted from the threaded channel 69 so as to slide the tooth stop 54 along the undercut slot 64. Depending upon the pitch of the screw thread and the number of threads per inch, extremely fine adjustment of the position of the tooth stop pawl 58 can be obtained by manipulating the adjustment bolt 66.

To use the sharpener 10 for accurate sharpening of the chain saw teeth, the frame 12 is initially placed over the guide bar of the chain saw with the rotary burr 44 fully inserted into a bore 36 and engaging the cutting portion of a tooth that has the same rake angle as the combined angle of the bore 36 and channel 24 containing the burr 48. The frame 12 is then positioned to be parallel to the guide bar and the clamping screws 40 are securely tightened against the guide bar to maintain the relative positions of the sharpener 10 and guide bar. The tooth stop pawl adjustment bolt 66 is rotated to move the tooth stop 54 along the undercut slot 64 until the pawl member 58 abuts the rearmost portion of the tooth that is to be sharpened to position the tooth snugly against the rotary burr 44. The rotary burr 44 is then removed from the guide bore 36 and the adjustment bolt 66 is rotated a predetermined fraction of a revolution to advance the tooth stop pawl 58 (and thus the tooth to be sharpened) across the opening 22 in the sharpener into a part of the area vacated by the rotary burr 48. This sets the depth of cut for the burr 48. With the rearmost portion of the tooth still firmly abutting the tooth stop pawl 58, the clamping screw 38 is advanced so as to force the spring clip 40 into light engagement with the tooth, thus maintaining the position of the tooth relative to the sharpener 10. No further adjustment of the clamping screw 38 is necessary. The rotary burr 48 is then reinserted into the appropriate guide bore 36 until contact with the tooth is established, upon which the burr 48 is rotated in a clockwise direction while fully inserting the burr 48 into the guide bore 36 to completely sharpen the tooth. The burr 48 is then withdrawn from the guide bore 36, and the chain is advanced to move the adjacent tooth in the chain (which is of the opposite hand) underneath the pawl member 58. The pawl member 58 is pivoted in a counterclockwise direction as the next tooth passes thereunder into the sharpening area 22. Once the tooth passes the pawl 58 and the pawl 58 pivots back to its substantially vertical position, the chain is moved in the opposite direction to abut the rearmost portion of the tooth firmly against the tooth stop pawl 58. Thus, the subsequently-introduced tooth is positioned in the sharpening area 22 in the identical location as the previously-sharpened tooth. The rotary burr 44 is inserted into the alternate guide bore 36 to sharpen the tooth. The foregoing process is repeated, the rotary burr 44 alternating between bore guides depending upon the hand of the tooth to be sharpened, until all the teeth are sharpened.

Figure 5:
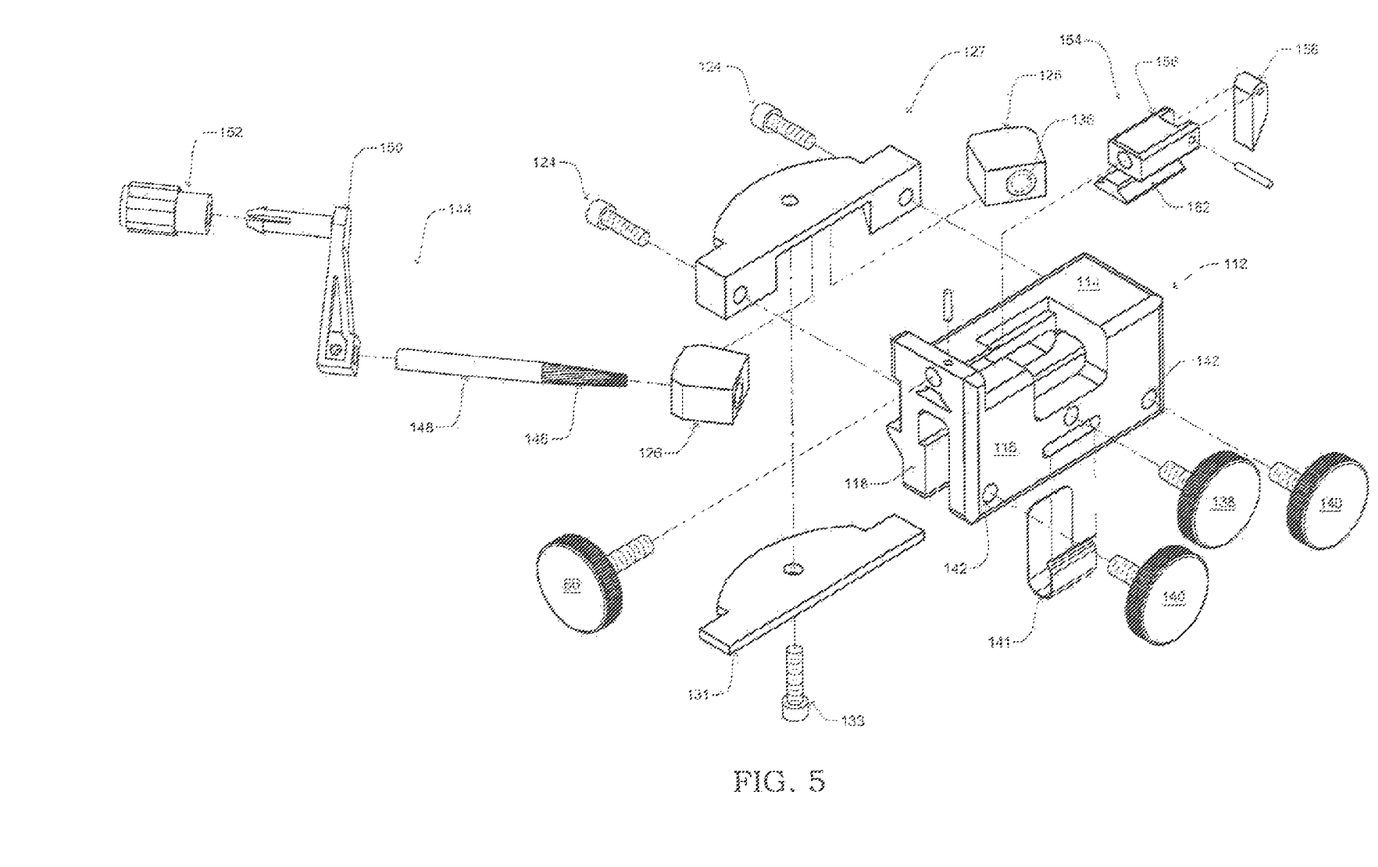
FIG. 5 is a perspective view of a chain saw sharpener in accordance with another example of the present disclosure.
Figure 6:
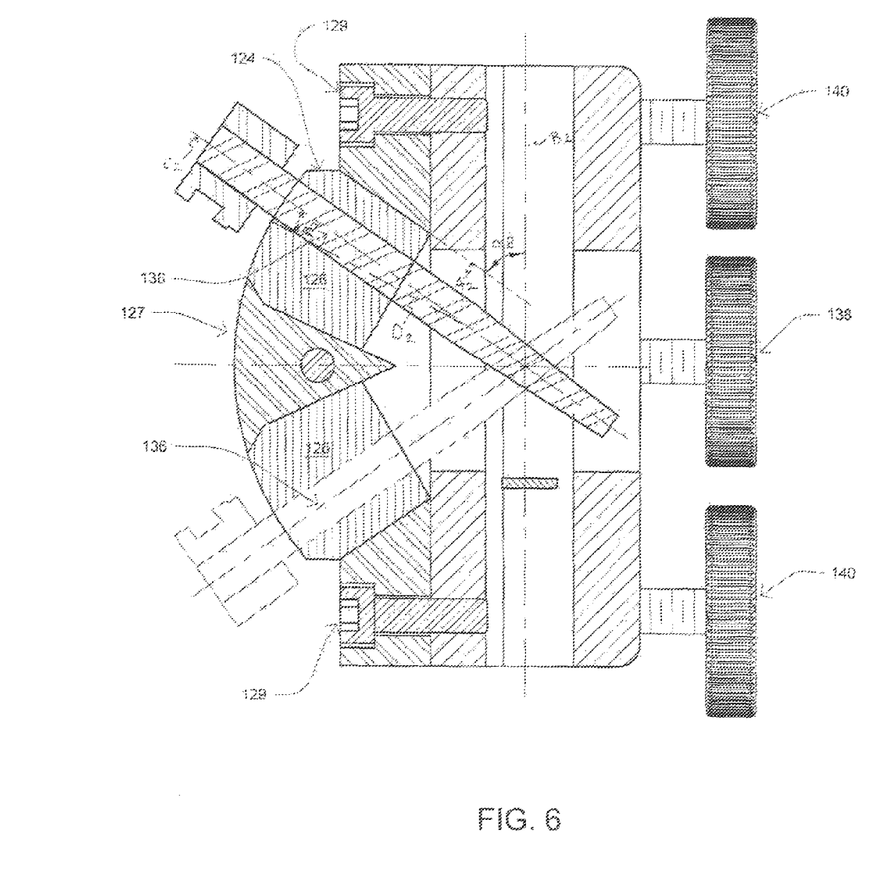
FIG. 6 is a cutaway view of the chain saw sharpener of FIG. 5.

Referring now to FIGS. 5 and 6 an alternative embodiment of a chain saw sharpener 110 in conjunction with examples of the present invention is shown. The sharpener 110 of the alternative embodiment has many parts in common with and functions similar to the sharpener 10 previously described. As such, the description above of like elements is incorporated here and intended to be applicable to the sharpening device 110, where applicable, and unless indicated otherwise. The sharpener 110 includes a generally U-shaped frame 112 having an upper web 114 connecting first and second side walls 116, 118 respectively. A central portion 120 of the upper web 114 and the first side wall 116 is cut away to define an open area through the web 114 and side wall 116 for receiving the chain saw tooth 114 to be sharpened. The channels 124 are configured to each independently receive a removable burr guide 126. The independently removable burr guides 126 can be secured and removed from the channels 124 by removing the bore guide housing 127 from the frame 112 by loosening screws 129 and then removing top plate 131 by loosening screw 133.

Much like the previous embodiment, the burr guides 126 are inclined toward a line A2 perpendicular to the guide bar of the chain and the sharpening area at an angle α2. The angle α2 can vary but can be in the range from about 20° to about 40°. In one presently preferred embodiment angle α2 is about 30°.

The center axis C2 of the bore 136 of the burr guides 126 can be varied and can be at an angle β2 from center line D2 of the burr guides 126 so that when the bore guide is in a first position it is configured to sharpen a tooth having a first rake angle and when it is rotated 180° it is configured to sharpen a tooth having a second rake angle. For example if angle α2 is about 30° and angle β2 is about 5°, the combined angles can be used to sharpen a tooth having a rake angle of about 35° in a first position and a rake angle of about 25° when it is rotated about line D2 180° to a second position.

Figure 7:
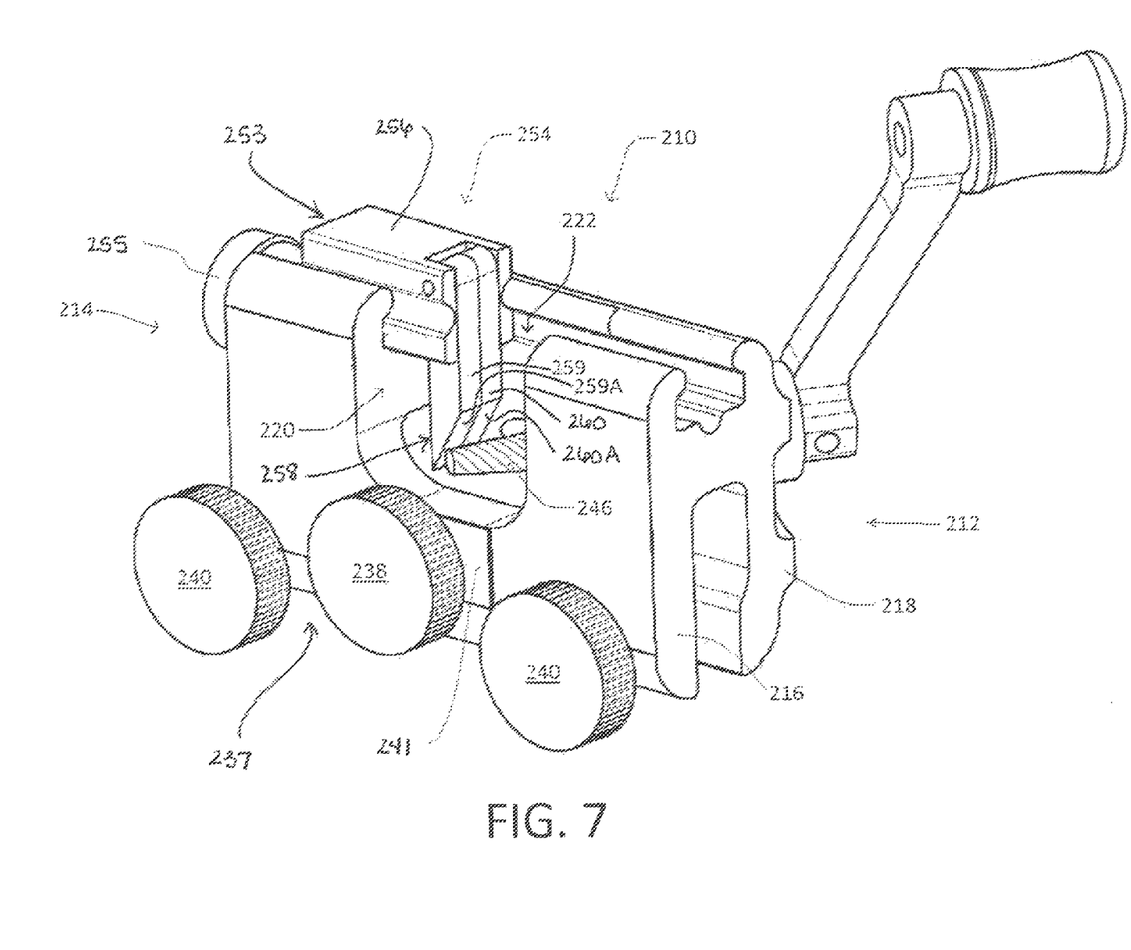
FIG. 7 is perspective view of a chain saw sharpener in accordance with still another example of the present disclosure.

Referring now to FIG. 7, illustrated is a chain saw sharpener or sharpening device for sharpening the cutting teeth of a chain saw in accordance with another example of the present disclosure. The sharpening device 210 is similar in many respects as the sharpening devices discussed above, and shown in FIGS. 1-6, and comprises many similar elements and features, and functions in a similar manner. As such, the description above of like elements is incorporated here and intended to be applicable to the sharpening device 210, where applicable, and unless indicated otherwise. As shown, the sharpening device 210 can comprise a generally U-shaped frame 212 having an upper web 214 and first and second side walls 216, 218. The device 212 can also comprise an open area 222 adjacent a center 220 of the upper web 214 defining a sharpening area in the open area 222.

The sharpening device 210 can further comprise at least one clamping assembly or clamping member 237 operable with at least one of the first and second sidewalls 216, 218 of the frame 212 for securing the frame 212 to the guide bar of the chain saw (not shown). The clamping member 237 can include one or more clamping screws 240, as shown, or various other clamping elements, such as a quick release mechanism, a set screw, a spring, etc., which can further facilitate adjustment of the sharpening device 210 about the guide bar of the chain saw. Additionally, the clamping member 237 can comprise a clamping screw 238 can be used to securely position a tooth of the saw chain within the open sharpening area 222 of the frame 212. The clamping screw 238 can operate together with a spring clamp 241, similarly as discussed above.

The sharpening device 210 can further comprise a second clamping assembly or clamping member 253 movably (e.g., slidably) supported about the frame 212. The second clamping member 253 can operate to engage a tooth of a chain saw chain and to fix a position of the chain saw tooth with respect to the sharpening area.

Figure 8:
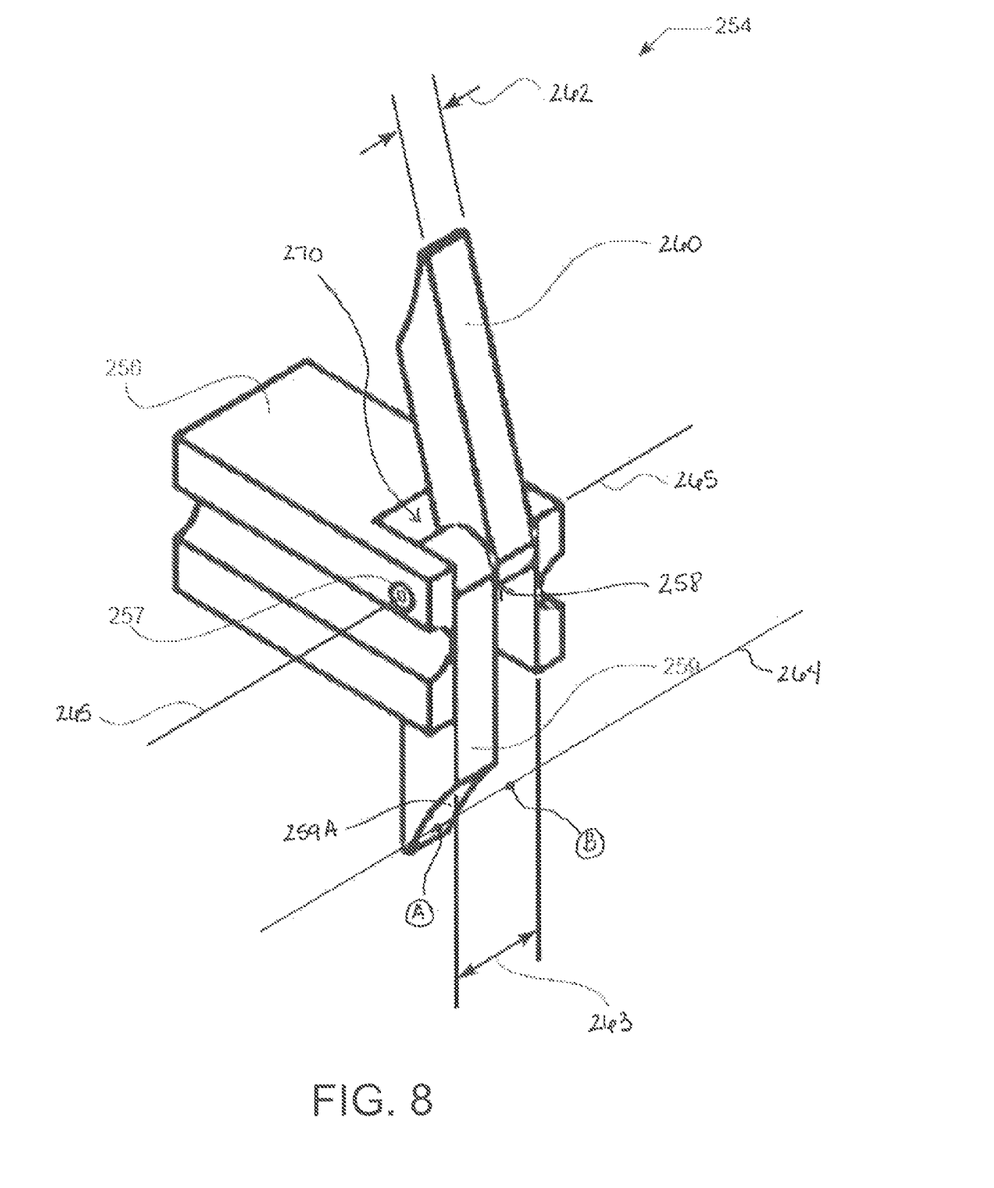
FIG. 8 is a perspective view of the tooth stop of the chain saw sharpener of FIG. 7, in accordance with an example of the present disclosure.

With reference to FIGS. 7-8, the second clamping member 253 can comprise a tooth stop 254 for adjusting the position of the chain saw tooth within the sharpening area, in a similar manner as described above. The tooth stop 254 can comprise a pawl support block 256 and a pawl 258 operable with the tooth stop 254 similar to those described above in many respects in terms of form and function. However, unlike the tooth stops, pawl support blocks and pawls described above, as shown in this example, the tooth stop 254 can comprise a pawl support block 256 and a pawl 258 having at least one working portion that can engage the saw chain at different positions in order to maximize or optimize the available clearance for a sharpening tool within the sharpening area. In other words, the pawl 258 described herein can comprise a working portion that engages the teeth of the saw chain from different positions relative to the pawl support structure 256.

In one example, the tooth stop 254 can comprise a pawl support block 256 and a pawl 258 moveable about the pawl support block 256, the pawl 258 having a working portion that can engage the chain at different positions along a lateral axis relative to the pawl support block 256 for the purpose of providing greater clearance for a sharpening tool, such as a rotary cutter or burr. The lateral axis can be defined as extending perpendicular to (or that is normal to) a sidewall of the pawl support block 256, and the first and second side walls 216, 218 of the u-shaped frame 212, such as in the same direction as the axis about which the pawl 258 rotates relative to the pawl support block 256. For instance, in the particular example shown, the lateral axis can be defined as an axis extending parallel to an axis about which the pawl 258 pivots relative to the pawl support block 256 (e.g., the lateral axis can be parallel to the axis of rotation as defined by the pin-type retention feature, discussed further below). Lateral axis 264 illustrates one example of a position and direction of a lateral axis as contemplated herein.

The pawl 258 can include a first finger 259 having a first working portion 259A and a second finger 260 having a second working portion 260A. As such, it can be said that the pawl 258 can comprise first and second working portions on the first and second fingers 259, 260, respectively. The first and second fingers 259, 260 can be selectively and individually deployable to achieve a working portion at different positions along the lateral axis. For example, the first finger 259 can be deployable to position the first working portion 259A at a first position along the lateral axis. Likewise, the second finger 260 can be deployable to position the second working portion 260A at a second position along the lateral axis. Indeed, selectively deploying the first and second fingers 259, 260 of the pawl 258 can selectively locate a working portion of the pawl at different locations along the lateral axis, the benefit of which is to minimize the amount of pawl structure within the sharpening area in order to maximize or optimize the available clearance for a sharpening tool within the sharpening area, and to provide a clearance for a sharpening tool to that it does not come in contact with any pawl structure within the sharpening area, which is described in more detail below. It is noted that the pawl 258 can alternatively include a pawl design that, itself, is selectively adjustable along the lateral axis, as will be described more fully below.

It is to be understood that in some contexts the term "pawl" as used herein, and with specific reference to "pawl" 258, can mean a single pawl having multiple pawl components. For example, the pawl 258 can be described as above, namely as a single pawl having two separately deployable fingers 259, 260 that operate adjacent one another. Alternatively, the first and second fingers 259, 260 of the "pawl" 258 can be considered as first and second pawls of the second clamping member, rather than referring to them as pawl components or fingers of a single "pawl." Whether the fingers 259, 260 are thought of as pawl components of a single pawl of the tooth stop 254, or as first and second pawls of the tooth stop 254, the effect is the same, namely to provide the second clamping member 253 and the tooth stop 254 with a working portion at different positions along the lateral axis of the tooth stop 254.

In the example shown, the pawl support block 256 can comprise a u-shaped opening 270 at one end. The second finger 260 of the pawl 258 can comprise a width 262, which is less than the width 263 of the opening 270 of the pawl support block 256. In some examples, the width 262 of the finger 260 of the pawl 258 can be approximately half the width 263 of the opening 270. In other examples, the width 262 of the finger 260 of the pawl 258 can be more or less than half the width 263 of the opening 270. Suffice it to say that the finger 260 can comprise a width smaller than the opening 270 of the pawl support block 256, which enables location of a working portion operable to engage the teeth of a saw chain to be positionable in different lateral positions, thereby defining a larger gap or clearance within the sharpening area for a sharpening tool to operate within without being impeded by the pawl. The first finger 259 of the pawl 258 can be likewise configured, such that fingers 259, 260 are supported about the pawl support block 256 within the opening 270.

The pawl 258, and fingers 259, 260, can be operably connected to the pawl support block 256, such that fingers 259, 260 are pivotable about the pawl support block 256. In one example, fingers 259, 260 can be pivotably coupled to the pawl support block 256 within the opening 270 via a retention feature extending through the pawl support block 256 and the fingers 259, 260 from one position at an end of the opening 270 to a position at an opposite end thereof. In one aspect, the retention feature can comprise a pin 257 of various configurations (e.g., solid, crimped, rolled, etc.), that can extend through apertures formed in each of the fingers 259, 260, and which can be secured to and between the extensions or protrusions of the u-shaped opening 270, thereby pivotally securing the fingers 259, 260 to the pawl support block 256. It is to be understood that various attachment mechanisms can be used to retain the pawl 258 in position relative to the pawl support block 256, such that the pawl 258, and fingers 259, 260, is/are able to pivot about what would be the major axis 265 of the pin 257.

In this example, each of the fingers 259, 260 of the pawl 258 can be individually actuated or pivoted upward or downward independent of the other for selectively deploying a working portion of the pawl 258 at different positions along a lateral axis 264 of the pawl support block 256, and for creating a gap or clearance within the sharpening area due to the absence of additional pawl structure within the sharpening area, the gap or clearance existing in a direction of motion of a sharpening tool, such that the sharpening tool is not impeded by any pawl structure within the sharpening area. Indeed, providing the pawl 258 with selectively deployable fingers 259, 260 allows a portion of the structure of the pawl 258 to be moved out of the way and out of the sharpening area during a sharpening operation (in this case one of the fingers 259, 260), thus providing additional clearance within the sharpening area in which the sharpening tool can move without contacting the pawl 258. For instance, as shown, the finger 259 can be deployed downward into the sharpening area in the open area 222 to locate the working portion 259a at a tooth engaging position "A" about the lateral axis 264. At the same time, the finger 260 can be pivoted upward and out of the way of the sharpening area and the open area 222, thus providing additional clearance to a sharpening tool, such as a rotary burr, during a sharpening operation. Although not shown, it will be appreciated that, in a similar manner, the finger 259 can be pivoted upward and out of the way of the sharpening area and the open area 222, and the finger 260 deployed in a downward position into the sharpening area in the open area 222 to locate the working portion 260a at a tooth engaging position "B" about the lateral axis 264. These two respective positions of the fingers 259, 260 can provide additional clearance to a sharpening tool during a sharpening operation, wherein the clearance provided can be located in different positions within the sharpening area depending upon the positioning of each finger, whether in the deployed or inactive position (the position of the fingers 259, 260 being determined by whether a right or left hand tooth of the saw chain is to be sharpened). FIG. 7 illustrates a situation where each of the first and second fingers 259, 260 are deployed and in a downward position within the sharpening area. Although the tooth stop 254 would not be used this way in an actual sharpening operation, this illustrates how the first finger 259 can occupy some of the sharpening area and lessen the clearance available to the sharpening tool 246. In this situation, the sharpening tool 246 can be caused to come in contact with the first finger 259 in the event the tooth to be sharpened is reduced enough in its remaining material makeup so as to create this situation. In such a case, actuation of the sharpening tool 246 beyond a certain distance can cause the sharpening tool 246 to come into contact with and cut into and damage the finger 259 of the pawl 258. To avoid this, one would likely discontinue the sharpening operation to avoid damage to the finger 259 of the pawl 258, wherein the tooth being sharpened may not get fully sharpened and thus forcing the user to replace the saw chain rather than ruin the sharpening device. FIG. 3 illustrates a similar scenario where the pawl 58 is of a particularly large size occupying the full width of the opening of the pawl support block 56. One advantage of the present disclosure is being able to move the first and second fingers 259, 260 to an inactive upward position so that they are out of the way of the sharpening area. This greatly increases the available clearance available to the sharpening tool during a sharpening operation, and can facilitate additional sharpening of the saw chain teeth that may not otherwise be available if using the full pawl structure of FIG. 3.

With reference again to FIGS. 7-8, the second clamping member 253 can further comprise an adjustment member 266A for adjusting the position of the tooth stop 254 relative to the frame 212, which adjustment member 266A can be similar to the adjustment members discussed above. The adjustment member 266A can operate to position the tooth stop 254 inward or outward relative to the frame 212. In the example, shown, the adjustment 266a can comprise a threaded adjustment bolt similar to the one described above.

Figures 9A, 9B:
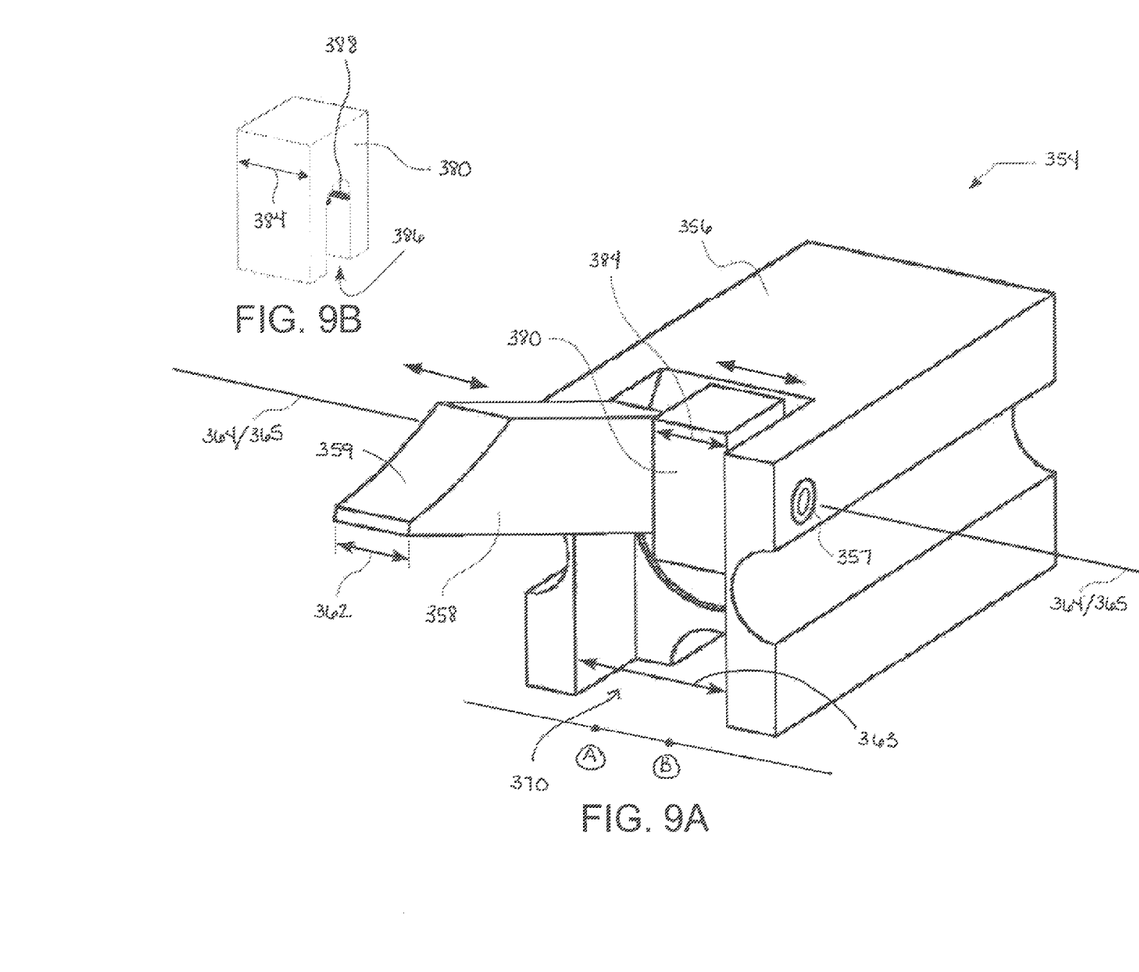
FIG. 9A is a perspective view of a tooth stop operative with the chain saw sharpener of FIG. 7, the tooth stop configured in accordance with another example of the present disclosure.
FIG. 9B is a perspective view of a spacer of the tooth stop of FIG. 9A.

Referring to FIGS. 9A and 9B, illustrated is another example of a tooth stop of the second clamping member shown in FIG. 7 (and that is operable with the sharpening device shown in FIG. 7 upon replacing tooth stop 254 with the one described here), wherein the tooth stop 354 is configured to engage the teeth of a saw chain at different positions to minimize the amount of pawl structure within the sharpening area in order to maximize or optimize the available clearance for a sharpening tool within the sharpening area. Similar to the example shown in FIGS. 7-8, in this example the tooth stop 354 is configured to engage the saw chain at different positions along a lateral axis 364 for the purpose of providing greater clearance for the sharpening tool within the sharpening area and maximizing or optimizing the available clearance for the sharpening tool within the sharpening area. In this example, the tooth stop 354 can comprise a pawl support block 356 and a pawl 358 moveable about the pawl support block 356, the pawl 358 having a working portion that can engage the saw chain at different positions along the lateral axis 364 relative to the pawl support block 356. The lateral axis 364 can be co-linear with the axis 365 about which the pawl 358 rotates relative to the pawl support block 356.

The pawl 358 can comprise a single pawl design (i.e., only a single finger) moveable about the lateral axis 365. The pawl 358 can comprise a working portion 359 operable and configured to engage a tooth of the saw chain. The pawl 358 can be pivotally coupled to the pawl support block 356 about pivot axis 365 using a retention member, such as pin 357, thus the pawl 358 can be selectively actuated or deployed and pivoted between a working position within the sharpening area (e.g., wherein the pawl 358 is pivoted downward), and an inactive position (e.g., wherein the pawl 358 is pivoted upward). As is the case with the example tooth stop 254 discussed above, it is to be understood that, for tooth stop 354, various attachment mechanisms can be used to retain the pawl 358 about the pawl support block 356.

In addition to the pawl 358 being pivotable about the pivot axis 365, the tooth stop 354, and namely the pawl support block 356 and the pawl 358, can further be configured to facilitate or provide for lateral movement of the pawl 358 relative to the pawl support block 356. In other words, the pawl 358 can be adjustable along the lateral axis 364. Lateral movement can be bi-directional, meaning the pawl 358 can be positioned at any desired position (i.e., the pawl 358 can be caused to move back and forth as needed between different lateral positions) about the pawl support block 356 and the lateral axis 364. Selective lateral positioning of the pawl 358 about the pawl support block 356 and the lateral axis 364 provides for the selective positioning of the working portion 359 of the pawl 358 at different positions along the lateral axis 364 for similar reasons and advantages as explained herein, wherein the second clamping member and the tooth stop 354 are provided with a working portion at different positions along the lateral axis 364 of the tooth stop 354.

The pawl support block 356 can comprise a u-shaped opening 370 at one end. The pawl 358 can comprise a width 362 that is less than the width 363 of the opening 370 of the pawl support block 356. As such, the pawl 358 can slide back and forth within the opening 370 for the purpose of locating the working portion 359 in different positions relative to a tooth to be sharpened, and for maximizing the clearance imparted to the sharpening tool within the sharpening area as a result of the reduced amount of pawl structure within the sharpening area. In one example, the pawl 358 can be deployed and slid along the pin 357 within the u-shaped opening 370 to locate the working portion 359 of the pawl 358 at a tooth engaging position "A". Likewise, the pawl 358 can be deployed and slid along the pin 357 within the u-shaped opening 370 to alternatively locate the working portion 359 of the pawl 358 at a tooth engaging position "B" depending upon whether a right or left hand tooth of the saw chain is to be sharpened.

In another example, the tooth stop 354 can further comprise a spacer 380 having a lateral width 384, wherein the spacer 380 is operable with the pawl 358 to position the pawl 358 about the lateral axis 364 and to prevent inadvertent lateral movement of the pawl along the axis 364. The spacer 380 can comprise a channel or slot 386 formed therein, the slot 386 being configured to receive the pin 257, thus removably securing the spacer 380 to the pawl support block 356. Stated differently, the spacer 380 can have a slot 386 formed therein to accommodate the pin 357 in an installed position. The spacer 380 can be removably secured to the pawl support block 356 on either side of pawl 358, depending upon the desired position of the pawl 358. Securing the spacer 380 in place functions to lock the pawl 358 into the desired position in preparation of a sharpening event. The pawl 358 can still be configured to pivot upward or downward relative to the spacer 380. In one example, the spacer 380 can be removably secured to the pawl support block 356 such that it is positioned on a first side of the pawl 358 in anticipation of sharpening one of a left or right-hand tooth of the saw chain. When the other of a left or right-hand tooth of the saw chain is desired to be sharpened, the spacer 380 can be removed from the pawl support block 356, the pawl 358 repositioned, and the spacer 380 removably coupled to the pawl support block 356 such that it is positioned on a second side of the pawl 358. The spacer 380 can comprise a lateral width 384 that is less than the width 363 of the u-shaped opening 370 of the pawl support block 356. The slot 386, in some examples, can include one or more protrusions or nubs or ribs 388 formed about one or more sidewalls defining the slot 386, the function of the protrusion 388 being to provide a retention feature for retaining the spacer 380 on the pin 357 when installed (e.g., a snap-on, snap-off function). Although shown in the figures as a block-like structure, the spacer 380 can be comprise other designs or devices, such as a plurality of washers, a slotted component, a threaded component, or other structural components as will be recognized by those skilled in the art. In addition, the spacer 380 can be configured to provide other functions or benefits. In one example, the spacer 380 can be constructed, such that it slightly deforms when installed in order to surround the pin 357 upon installation. The spacer 380 can also be configured so that it is maintained out of the sharpening area so that it does not interfere or come in contact with the sharpening tool.

The second clamping member can further comprise an adjustment member (not shown) for adjusting the position of the tooth stop 354 relative to the frame, which adjustment member can be similar to the adjustment members discussed above. The adjustment member can operate to position the tooth stop 354 inward or outward relative to the frame.

Although some specific examples have been shown herein, one skilled in the art will recognize a number of different ways to configure the second clamping member and the tooth stop to minimize the amount of pawl structure within the sharpening area during a sharpening event in order to maximize or optimize the available clearance for a sharpening tool to move within the sharpening area. For instance, rather than having the pawl (e.g., fingers 259, 260 of FIGS. 7-8) pivot into a downward or upward position, the pawl can be coupled to the pawl support block in a sliding manner, such that it is able to translate or slide upward or downward relative to the pawl support block into and out of a deployed, tooth engaging position, such as along a rail system formed between the pawl support block and the pawl (e.g., between the pawl support block 256 and the fingers 259, 260 of pawl 258 of FIGS. 7-8), the pawl being locked into a desired position by a set screw that bears against the pawl support block, or by another type of locking device. In this example, although not shown in the drawings, each of the pawl and the pawl support block can comprise a rail interface configured to engage and be operable with one another to facilitate the sliding of the pawl relative to the pawl support block. Depending upon the position of the pawl, or the components of the pawl, depending upon the pawl design being used, the working portion can be located at different locations along the lateral axis, similarly as described herein. Those skilled in the art will recognize that still other designs or configurations of the second clamping member and the tooth stop can be implemented, which designs or configurations are contemplated herein. Indeed, those skilled in the art will recognize that the examples shown in the drawings and discussed herein are not intended to be limiting in any way.

Figure 10:
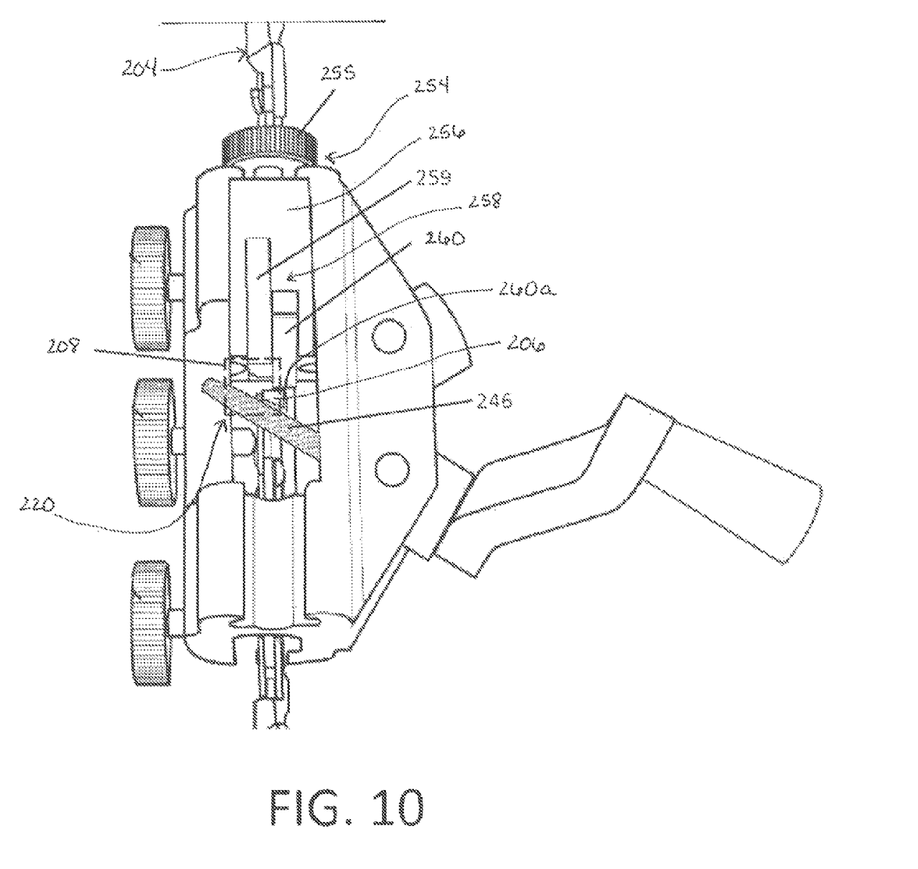
FIG. 10 is a top perspective view of an example chain saw sharpener according to the present disclosure.

With reference to FIGS. 7, 8 and 10, illustrated is an example sharpening operation, wherein the sharpening device 210 is positioned over the guide bar of a chain saw, the guide bar in support of a chain saw chain 204. In this example, the first finger 259 of the pawl 258 is positioned in an upward, inactive position away from the sharpening area. Conversely, the second finger 260, is deployed in a downward, active or tooth engaging position with the working portion 260a of the finger 260 in contact with a tooth 206 of the chain saw chain 204 in preparation for a sharpening operation using the carbide sharpening tool 246. As can be seen, the positioning of the pawl 258, and particularly the fingers 259, 260, as shown, provides a spatial relationship (i.e., a gap or clearance) of the pawl 258 relative to the chain saw tooth 206 when positioned for sharpening. This gap or clearance is illustrated as area 208 located within the sharpening area, the area 208 being circumscribed by representative dotted lines in FIG. 10. The pawl 258, as so configured, can provide a relatively small working portion 260a (as compared to the working portion on pawl 58 of FIG. 1) in a beneficial lateral position within the sharpening opening 261, and can provide clearance for the cutting tool (e.g., carbide rotary component) to access additional tooth material for sharpening without coming in contact with and being interfered with any pawl structure that otherwise could be occupied by the first finger 259 were it to be in its downward, deployed position (or if a differently configured pawl were to be used that did not provide similar benefits as pawl 258). In other words, there can be more space for the cutting tool to reach a greater amount of material making up the tooth when half (or at least a portion) of the opening is free for the cutting tool to access and operate within, no longer impeded by a portion of the pawl that otherwise would have been there if the pawl were close to the full width or at the full width of the opening 220. With the tooth stop 254 of the sharpening device configured as described herein, a greater amount of the teeth of the chain saw chain can be available for sharpening than otherwise would have been possible, thus extending the life of each tooth in the chain saw chain and the overall life of the chain saw chain.

One skilled in the art will recognize that the tooth stop 354 of FIGS. 9A and 9B can be operated in a similar manner as the tooth stop 254 of FIGS. 7, 8 and 10.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A sharpening device for sharpening the cutting teeth of a chain saw chain, the device comprising:
   a frame having an upper web and first and second side walls;
   an open area adjacent a center of the upper web defining a sharpening area;
   at least one clamping member operable with at least one of the first and second sidewalls of the frame for securing the frame to a guide bar of the chain saw; and
   a second clamping member movably supported about the frame, the second clamping member operating to engage a chain saw tooth of a chain, and to fix a position of the chain saw tooth with respect to the sharpening area, the second clamping member comprising:
a tooth stop comprising a pawl support block and a pawl having at least one working portion, the pawl being operable to engage the chain at different lateral positions along a lateral axis of the pawl support block to provide clearance for a sharpening tool within the sharpening area; and
an adjustment member for adjusting the position of the tooth stop relative to the frame.

2. The sharpening device of claim 1, wherein the pawl comprises:
a first finger having a first working portion; and
a second finger having a second working portion;
wherein the first and second fingers are selectively and individually deployable to achieve the different lateral positions along the lateral axis.

3. The sharpening device of claim 2, wherein the first finger is deployable to achieve a first lateral position of the first working portion along the lateral axis, and wherein the second finger is deployable to achieve a second lateral position of the second working portion along the lateral axis.

4. The sharpening device of claim 1, wherein the pawl comprises a single pawl having the working portion thereon, the single pawl being laterally positionable along the lateral axis.

5. The sharpening device of claim 4, wherein the tooth stop further comprises a spacer operable to secure the pawl in a lateral position relative to the pawl support block, and to prevent inadvertent lateral movement of the pawl.

6. The sharpening device of claim 5, wherein the spacer comprises a slot operable to engage a retention member coupling the pawl to the pawl support block.

7. The sharpening device of claim 5, wherein the spacer is removably coupled to the pawl support block.

8. A system for sharpening the cutting teeth of a chain saw, the system comprising:
a chain saw having a guide bar and a chain supported about the guide bar; and
a sharpening device, the sharpening device comprising:
a frame having an upper web and first and second side walls;
an open area adjacent a center of the upper web defining a sharpening area;
at least one clamping member operable with at least one of the first and second sidewalls of the frame for securing the frame to the guide bar; and
a second clamping member movably supported about the frame, the second clamping member operating to engage a chain saw tooth of a chain, and to fix a position of the chain saw tooth with respect to the sharpening area, the second clamping member comprising:
a tooth stop comprising a pawl support block and a pawl having at least one working portion engageable with the chain at different positions along a lateral axis of the pawl support block to provide clearance for a sharpening tool within the sharpening area; and
an adjustment member for adjusting the position of the tooth stop relative to the frame.

9. The system of claim 8, wherein the pawl comprises:
a first finger having a first working portion; and
a second finger having a second working portion;
wherein the first and second fingers are selectively and individually deployable to achieve the different positions along the lateral axis, and to provide the clearance for the sharpening tool.

10. The system of claim 9, wherein the first finger is deployable to achieve a first position of the first working portion along the lateral axis, and wherein the second finger is deployable to achieve a second position along the lateral axis.

11. The system of claim 8, wherein the pawl comprises a single pawl having the working portion thereon, the single pawl being positionable along the lateral axis.

12. The system of claim 11, wherein the tooth stop further comprises a spacer operable to secure the pawl in a lateral position relative to the pawl support block, and to prevent inadvertent lateral movement of the pawl.

13. The system of claim 12, wherein the spacer comprises a slot operable to engage a retention member coupling the pawl to the pawl support block.

14. The system of claim 12, wherein the spacer is removably coupled to the pawl support block.

15. A method for facilitating sharpening the cutting teeth of a chain saw while the chain is in place on a guide bar of the chain saw, the method comprising:
providing a sharpening device for sharpening the cutting teeth of a chain saw, the device comprising:
a frame having an upper web and first and second side walls;
an open area adjacent a center of the upper web defining a sharpening area;
at least one clamping member operable with at least one of the first and second sidewalls of the frame for securing the frame to the guide bar; and
a second clamping member movably supported about the frame, the second clamping member operating to engage a chain saw tooth of a chain, and to fix a position of the chain saw tooth with respect to the sharpening area, the second clamping member comprising:
a tooth stop comprising a pawl support block and a pawl having at least one working portion, the pawl being operable to engage the chain at different lateral positions along a lateral axis of the pawl support block to provide clearance for a sharpening tool within the sharpening area; and
an adjustment member for adjusting the position of the tooth stop relative to the frame.

16. The method of claim 15, wherein the pawl comprises:
a first finger having a first working portion; and
a second finger having a second working portion;
wherein the first and second fingers are selectively and individually deployable to achieve the different lateral positions along the lateral axis.

17. The method of claim 16, further comprising facilitating deployment of the first finger within the sharpening area to achieve a first tooth engaging position of the first working portion along the lateral axis, and facilitating positioning of the second finger out of the sharpening area.

18. The method of claim 16, further comprising facilitating deployment of the second finger within the sharpening area to achieve a second tooth engaging position of the second working portion along the lateral axis, and facilitating positioning of the first finger out of the sharpening area.

19. The method of claim 15, wherein the pawl comprises a single pawl design having the working portion thereon, the method further comprising facilitating adjustment of the lateral position of the single pawl along the lateral axis to achieve different tooth engaging positions.

20. The method of claim 19, further comprising providing a spacer operable with the single pawl, the spacer being operable to secure the pawl in a lateral position relative to the pawl support block, and to prevent inadvertent lateral movement of the pawl.

* * * * *